(12) United States Patent
Cosgrove

(10) Patent No.: US 10,361,943 B2
(45) Date of Patent: Jul. 23, 2019

(54) METHODS PROVIDING PERFORMANCE MANAGEMENT USING A PROXY BASELINE AND RELATED SYSTEMS AND COMPUTER PROGRAM PRODUCTS

(71) Applicant: CA, Inc., New York, NY (US)

(72) Inventor: David Cosgrove, Portsmouth, NH (US)

(73) Assignee: CA, Inc., New York, NY (US)

(*) Notice: Subject to any disclaimer, the term of this patent is extended or adjusted under 35 U.S.C. 154(b) by 342 days.

(21) Appl. No.: 15/425,161

(22) Filed: Feb. 6, 2017

(65) Prior Publication Data
US 2018/0227210 A1 Aug. 9, 2018

(51) Int. Cl.
*H04L 12/24* (2006.01)
*H04L 12/26* (2006.01)
*H04L 29/08* (2006.01)

(52) U.S. Cl.
CPC .......... *H04L 43/16* (2013.01); *H04L 41/0893* (2013.01); *H04L 43/0876* (2013.01); *H04L 67/2804* (2013.01)

(58) Field of Classification Search
CPC .......................... H04L 43/16; H04L 67/2804
USPC ....................................................... 709/224
See application file for complete search history.

(56) References Cited

U.S. PATENT DOCUMENTS

| 9,246,747 B2 | 1/2016 | Chan et al. | |
|---|---|---|---|
| 2008/0016412 A1* | 1/2008 | White | G06F 11/3409 714/48 |
| 2013/0191107 A1* | 7/2013 | Tonouchi | G06F 11/3409 703/21 |
| 2017/0317950 A1* | 11/2017 | Revach | G06F 9/4843 |

OTHER PUBLICATIONS

"Network Performance Monitoring—CA Performance Management," Infrastructure Management, Copyright 2017 CA, 10 pages.
"CA Performance Management," Datasheet CS200-227552_1016, Copyright 2016 CA, 2 pages.
"CA Performance Management—3.0," Documentation powered by DocOps, last updated Jan. 11, 2017, 2 pages.
"CA Performance Management—3.0," Project Architecture, Jan. 13, 2017, CA Technologies, 5 pages.

* cited by examiner

*Primary Examiner* — Wing F Chan
*Assistant Examiner* — Leon Y Tseng
(74) *Attorney, Agent, or Firm* — Sage Patent Group

(57) ABSTRACT

A method may provide performance management for a data communication network including a plurality of network elements. The method may include defining a cluster of the network elements for a performance metric, and defining one of the network elements of the cluster as a proxy network element for the cluster. A proxy baseline of the performance metric for the cluster may be calculated based on performance metric data for the proxy network element, and the performance metric for each of the network elements of the cluster may be monitored using the proxy baseline of the performance metric. Related systems and computer program products are also discussed.

20 Claims, 6 Drawing Sheets

FIG. 4A

K-means Clustering: 1st Iteration

| Element No. | Performance Data | Distance to A | Distance to B | Distance to C | Cluster Assignment |
|---|---|---|---|---|---|
| 1 | 53 | 36 | 51 | 7 | C |
| 2 | 12 | 77 | 10 | 34 | B |
| 3 | 68 | 21 | 66 | 22 | C |
| 4 | 72 | 17 | 70 | 26 | A |
| 5* | 89 | 0 | 87 | 43 | A* |
| 6 | 82 | 7 | 80 | 36 | A |
| 7 | 68 | 21 | 66 | 22 | A |
| 8 | 82 | 7 | 80 | 36 | A |
| 9 | 5 | 84 | 3 | 41 | B |
| 10 | 26 | 63 | 24 | 20 | C |
| 11 | 90 | 1 | 88 | 44 | A |
| 12 | 88 | 1 | 86 | 42 | A |
| 13 | 90 | 1 | 88 | 44 | A |
| 14 | 98 | 9 | 96 | 52 | A |
| 15 | 22 | 67 | 20 | 24 | B |
| 16* | 2 | 87 | 0 | 44 | B* |
| 17 | 16 | 73 | 14 | 30 | B |
| 18 | 80 | 9 | 78 | 34 | A |
| 19* | 46 | 43 | 44 | 0 | C* |
| 20 | 5 | 84 | 3 | 41 | B |

* Centroid

| Cluster A Average | 83.9 |
|---|---|
| Cluster B Average | 10.3 |
| Cluster C Average | 48.3 |

FIG. 4B

K-means Clustering: 2nd Iteration

| Element No. | Iteration 1 | Distance to A | Distance to B | Distance to C | Cluster Assignment |
|---|---|---|---|---|---|
| 1 | 53 | 30.9 | 42.7 | 4.8 | C |
| 2 * | 12 | 71.9 | 1.7 | 36.3 | B * |
| 3 | 68 | 15.9 | 57.7 | 19.8 | A ** |
| 4 | 72 | 11.9 | 61.7 | 23.8 | A |
| 5 | 89 | 5.1 | 78.7 | 40.8 | A |
| 6 * | 82 | 1.9 | 71.7 | 33.8 | A * |
| 7 | 68 | 15.9 | 57.7 | 19.8 | A |
| 8 | 82 | 1.9 | 71.7 | 33.8 | A |
| 9 | 5 | 78.9 | 5.3 | 43.3 | B |
| 10 | 26 | 57.9 | 15.7 | 22.3 | B ** |
| 11 | 90 | 6.1 | 79.7 | 41.8 | A |
| 12 | 88 | 4.1 | 77.7 | 39.8 | A |
| 13 | 90 | 6.1 | 79.7 | 41.8 | A |
| 14 | 98 | 14.1 | 87.7 | 49.8 | A |
| 15 | 22 | 61.9 | 11.7 | 26.3 | B |
| 16 | 2 | 81.9 | 8.3 | 46.3 | B |
| 17 | 16 | 67.9 | 5.7 | 32.3 | B |
| 18 | 80 | 3.9 | 69.7 | 31.8 | A |
| 19 * | 46 | 37.9 | 35.7 | 2.3 | C * |
| 20 | 5 | 78.9 | 5.3 | 43.3 | B |

\* Centroid  
\*\* Change in Cluster

| | |
|---|---|
| Cluster A Average | 82.5 |
| Cluster B Average | 12.6 |
| Cluster C Average | 49.5 |

FIG. 4C

K-means Clustering: 3rd Iteration

| Element No. | Iteration 1 | Distance to A | Distance to B | Distance to C | Cluster Assignment |
|---|---|---|---|---|---|
| 1 | 53 | 29.5 | 40.4 | 3.5 | C |
| 2* | 12 | 70.5 | 0.6 | 37.5 | B* |
| 3 | 68 | 14.5 | 55.4 | 18.5 | A |
| 4 | 72 | 10.5 | 59.4 | 22.5 | A |
| 5 | 89 | 6.5 | 76.4 | 39.5 | A |
| 6* | 82 | 0.5 | 69.4 | 32.5 | A* |
| 7 | 68 | 14.5 | 55.4 | 18.5 | A |
| 8 | 82 | 0.5 | 69.4 | 32.5 | A |
| 9 | 5 | 77.5 | 7.6 | 44.5 | B |
| 10 | 26 | 56.5 | 13.4 | 23.5 | B |
| 11 | 90 | 7.5 | 77.4 | 40.5 | A |
| 12 | 88 | 5.5 | 75.4 | 38.5 | A |
| 13 | 90 | 7.5 | 77.4 | 40.5 | A |
| 14 | 98 | 15.5 | 85.4 | 48.5 | A |
| 15 | 22 | 60.5 | 9.4 | 27.5 | B |
| 16 | 2 | 80.5 | 10.6 | 47.5 | B |
| 17 | 16 | 66.5 | 3.4 | 33.5 | B |
| 18 | 80 | 2.5 | 67.4 | 30.5 | A |
| 19* | 46 | 36.5 | 33.4 | 3.5 | C* |
| 20 | 5 | 77.5 | 7.6 | 44.5 | B |

\* Centroid

| | |
|---|---|
| Cluster A Average | 82.5 |
| Cluster B Average | 12.6 |
| Cluster C Average | 49.5 |

METHODS PROVIDING PERFORMANCE MANAGEMENT USING A PROXY BASELINE AND RELATED SYSTEMS AND COMPUTER PROGRAM PRODUCTS

TECHNICAL FIELD

The present disclosure relates to data networks, and more particularly, to performance management and related methods, systems and computer program products.

BACKGROUND

The CA Performance Management Platform (CAMP) provides scalable network performance monitoring and analytics to meet the needs of big data and modern network architectures, including dynamic and complex hybrid cloud and software-defined networks (SDN). The platform provides agnostic data collection and adaptive visualization to provide insights into network availability and business service integrity.

CAMP is designed to reduce complexity inherent in modern networks built across numerous technology stacks using network performance monitoring and relationship mapping for operation assurance. CAMP provides operator visibility through discovery and network performance monitoring of highly sensitive cloud and multi-layered SDN networks and service chains.

In an environment where a platform continually gauges "normal" behavior for millions of network elements, calculation of baselines for every monitored network element may consume significant processing overhead/time, memory, disc space, etc. Accordingly, there continues to exist a need in the art for improved methods of performance management.

SUMMARY

According to some embodiments of inventive concepts, a method may provide performance management for a data communication network including a plurality of network elements. The method may include defining a cluster of the network elements for a performance metric, and defining one of the network elements of the cluster as a proxy network element for the cluster. A proxy baseline of the performance metric for the cluster may be calculated based on performance metric data for the proxy network element, and the performance metric for each of the network elements of the cluster may be monitored using the proxy baseline of the performance metric.

Defining a cluster may include defining a plurality of clusters of the network elements for the performance metric. Each of the clusters may include multiple ones of the plurality of network elements, and the network elements of each cluster may be mutually exclusive relative to the network elements of each of the other clusters. Defining one of the network elements of the cluster as a proxy network element may include defining for each of the plurality of clusters of network elements one of the network elements as a respective proxy network element for the cluster. Calculating the proxy baseline may include calculating respective proxy baselines of the performance metric for each of the proxy network elements for each of the clusters based on performance metric data for the respective proxy network elements. Monitoring the performance metric may include monitoring the performance metric for each of the network elements of the respective clusters of network elements using the respective proxy baselines of the performance metric for network elements of the respective clusters.

The performance metric may be a first performance metric, the plurality of clusters may be a plurality of first clusters, the proxy network elements may be first proxy network elements, and the proxy baselines may be first proxy baselines. A plurality of second clusters of the network elements may be defined for a second performance metric, each of the second clusters may include multiple ones of the plurality of the network elements, the network elements of each second cluster may be mutually exclusive relative to the network elements of each of the other second clusters, and the plurality of first clusters and the plurality of second clusters may be defined differently. For each of the second clusters of network elements, one of the network elements may be defined as a respective second proxy network element for the respective second cluster. Respective second proxy baselines of the second performance metric may be calculated for the respective second proxy network elements for each of the second clusters based on second performance metric data for the respective second proxy network elements. The second performance metric for each of the network elements of the respective second clusters of network elements may be monitored using the respective proxy baselines of the second performance metric for network elements of the respective second clusters.

Defining the plurality of clusters may include defining the plurality of clusters using k-means clustering, and defining for each of the plurality of clusters one of the network elements as a respective proxy network element may include using respective centroids of the k-means clustering for each cluster to select the respective proxy network elements for each of the clusters. Defining the plurality of clusters may include defining the plurality of clusters using k-means clustering based on data of the performance metric collected from the plurality of network elements over a first period of time, calculating the respective proxy baselines may include calculating the respective proxy baselines based on data of the performance metric collected from the proxy network elements over a second period of time, and the second period of time may be at least two times longer than the first period of time. The second period of time, for example, may be at least ten times longer than the first period of time.

Calculating the proxy baseline may include calculating the proxy baseline based on data of the performance metric for the proxy network element without using data of the performance metric for at least one other network element of the cluster. Monitoring the performance metric may include monitoring the performance metric for the at least one other network element of the cluster using the proxy baseline of the performance metric.

Monitoring the performance metric may include defining a proxy baseline range based on the proxy baseline. Monitoring, for example, may include initiating at least one of a notification and an alarm responsive to the performance metric for one of the network elements of the cluster other than the proxy network element falling outside the proxy baseline range. In addition or in an alternative, monitoring may include providing output for graphic display at a user workstation, the graphic display may include graphic representation of the proxy baseline range and data of the performance metric for at least one element of the cluster relative to the proxy baseline range.

The performance metric may include at least one of network element utilization, numbers of network element errors, and/or numbers of network element discarded messages. Each of the plurality of network elements, for example, may include a network device, such as a server or a router. In addition or in an alternative, each of the plurality of network elements may include an element of a network device, such as a memory slot of a network device, a network interface of a network device, a central processing unit core of a network device, a logical element of a network device, and/or a virtual process of a network device.

According to some other embodiments of inventive concepts, a performance management system may include a processor and a memory coupled to the processor. The memory may include computer readable program code that when executed by the processor causes the processor to perform operations including: defining a cluster of the network elements for a performance metric; defining one of the network elements of the cluster as a proxy network element for the cluster; calculating a proxy baseline of the performance metric for the cluster based on performance metric data for the proxy network element; and monitoring the performance metric for each of the network elements of the cluster using the proxy baseline of the performance metric.

Defining a cluster may include defining a plurality of clusters of the network elements for the performance metric, with each of the clusters including multiple ones of the plurality of network elements, and with the network elements of each cluster being mutually exclusive relative to the network elements of each of the other clusters. Defining one of the network elements of the cluster as a proxy network element may include defining for each of the plurality of clusters of network elements one of the network elements as a respective proxy network element for the cluster. Calculating the proxy baseline may include calculating respective proxy baselines of the performance metric for each of the proxy network elements for each of the clusters based on performance metric data for the respective proxy network elements. Monitoring the performance metric may include monitoring the performance metric for each of the network elements of the respective clusters of network elements using the respective proxy baselines of the performance metric for network elements of the respective clusters.

Defining the plurality of clusters may include defining the plurality of clusters using k-means clustering, and defining for each of the plurality of clusters one of the network elements as a respective proxy network element may include using respective centroids of the k-means clustering for each cluster to select the respective proxy network elements for each of the clusters.

According to still other embodiments of inventive concepts, a computer program product may include a non-transitory computer readable storage medium storing computer readable program code which when executed by a processor of an electronic device causes the processor to perform operations including: defining a cluster of the network elements for a performance metric; defining one of the network elements of the cluster as a proxy network element for the cluster; calculating a proxy baseline of the performance metric for the cluster based on performance metric data for the proxy network element; and monitoring the performance metric for each of the network elements of the cluster using the proxy baseline of the performance metric.

Defining a cluster may include defining a plurality of clusters of the network elements for the performance metric, with each of the clusters including multiple ones of the plurality of network elements, and with the network elements of each cluster being mutually exclusive relative to the network elements of each of the other clusters. Defining one of the network elements of the cluster as a proxy network element may include defining for each of the plurality of clusters of network elements one of the network elements as a respective proxy network element for the cluster. Calculating the proxy baseline may include calculating respective proxy baselines of the performance metric for each of the proxy network elements for each of the clusters based on performance metric data for the respective proxy network elements. Monitoring the performance metric may include monitoring the performance metric for each of the network elements of the respective clusters of network elements using the respective proxy baselines of the performance metric for network elements of the respective clusters.

BRIEF DESCRIPTION OF THE DRAWINGS

Other features of embodiments will be more readily understood from the following detailed description of specific embodiments thereof when read in conjunction with the accompanying drawings, in which:

FIGS. 4A, 4B, and 4C are tables illustrating k-means clustering as used for performance management according to some embodiments of the present disclosure.

DETAILED DESCRIPTION

In the following detailed description, numerous specific details are set forth in order to provide a thorough understanding of embodiments of the present disclosure. However, it will be understood by those skilled in the art that embodiments of present inventive concepts may be practiced without these specific details. In other instances, well-known methods, procedures, components and circuits have not been described in detail so as not to obscure present inventive concepts. It is intended that all embodiments disclosed herein can be implemented separately or combined in any way and/or combination.

Figure 1:
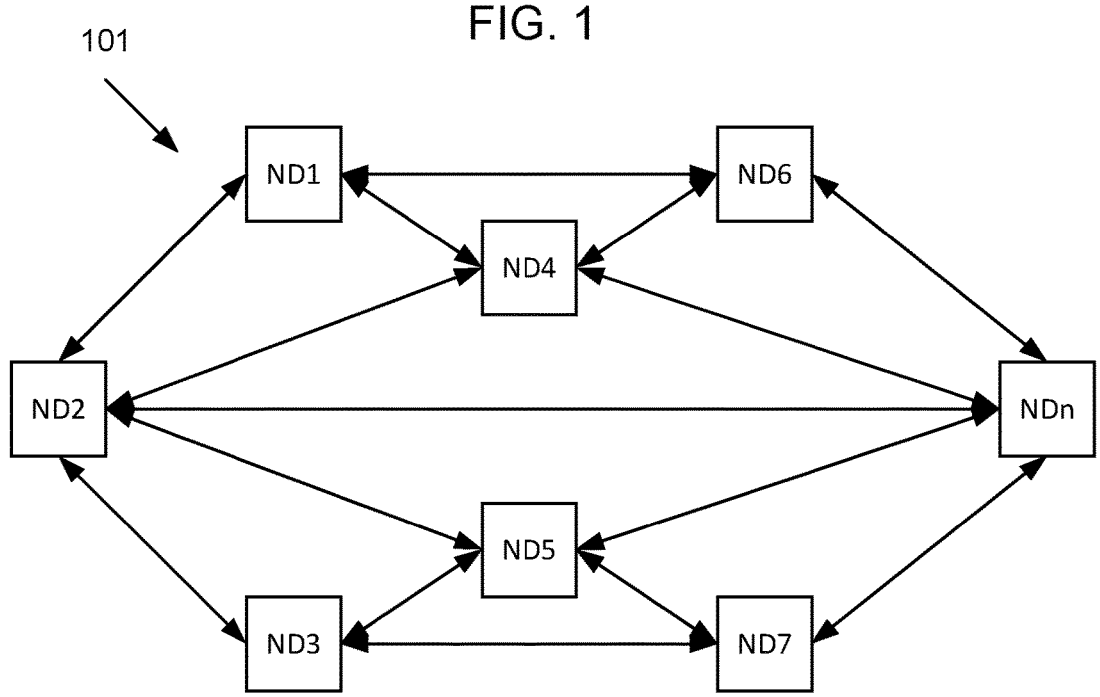
FIG. 1 is a block diagram illustrating an arrangement of network devices/elements according to some embodiments of the present disclosure.
Figure 2:
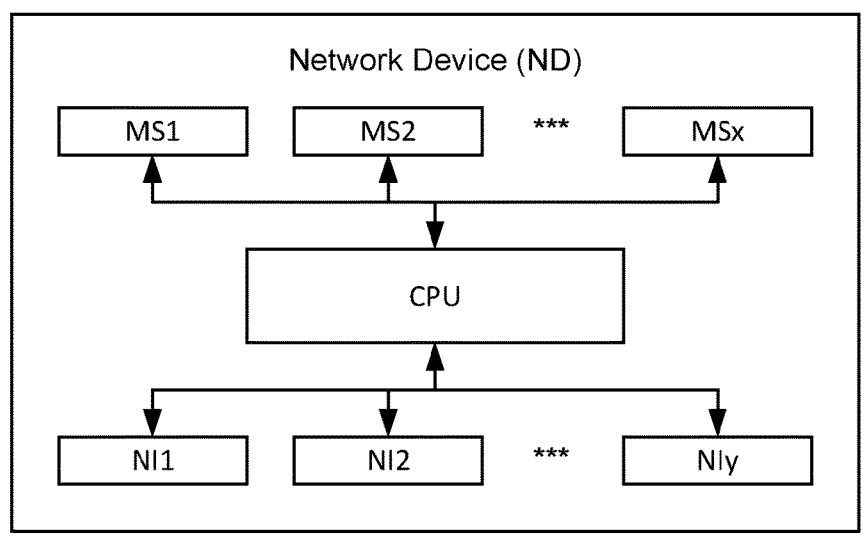
FIG. 2 is a block diagram illustrating a network device/element of FIG. 1 according to some embodiments of the present disclosure.

FIG. 1 is a block diagram illustrating an arrangement of network devices/elements according to some embodiments of the present disclosure, and FIG. 2 is a block diagram illustrating a network device/element of FIG. 1. As shown, a network 101 may include a plurality of interconnected network devices ND1 to NDn (such as servers and/or routers), and each network device ND may include a plurality of network elements such as network interfaces, memory slots, Central Processing Unit (CPU) cores, logical elements, etc. As used herein, the term network element may refer to a network device or to a physical or logical element of a network device. While eight network devices ND are shown in FIG. 8 for purposes of illustration, a real network may include hundreds, thousands, or even millions of network devices and/or elements.

As shown in FIG. 2, one network device, such as a server or router, may include a CPU (providing one or more CPU cores, a plurality of memory slots MS1 to MSx, and/or a plurality of network interfaces NI1 to NIy. As used herein, the term network element may include network devices (e.g., servers, routers, etc.), network interfaces of network devices, central processing unit cores of network devices, logical elements of network devices, virtual processes (e.g., virtual firewalls, virtual routers, etc.) of network devices, etc.

In addition, one or more performance metrics may be associated with each network device and with each network element, and these performance metrics may be monitored by a performance management system. As used herein, the term performance metric may include network element utilization, numbers of network element errors, network element discarded messages (i.e., messages discarded by a network element), etc. Moreover, data for these performance metrics may be separately provided/stored for each network element by time period (e.g., by hour, day, etc.). Because a network may include hundreds or thousands of network devices, because each network device may include many network elements, and because multiple performance metrics (e.g., 10s of performance metrics) may be monitored for each network device and for each network element, the processing, memory, and storage used for network performance management may be extensive.

In performance management systems, multiple performance metrics from each of the network elements may be compared with respective baselines to determine for each network element whether that network element is operating according to "normal" behavior. In such systems, graphical outputs may be provided to allow visual monitoring of reported performance metrics from network elements relative to the respective baselines and/or alarms may be provided responsive to detection of non-normal behavior.

In an environment where "normal" behavior is continually gauged for multiple performance metrics for millions of elements, it may not always be feasible or desirable to calculate baselines for every single monitored performance metric of every network element. In CA Performance Management (CAPM), hours of processing time may be consumed calculating baselines for every monitored performance metric for every network element, and each baseline calculation may use/require weeks of historical data as input.

According to some embodiments of the present disclosure, a clustering technique/process, such as K-Means clustering, may be used to identify a plurality of clusters of network elements of a same type and to determine respective "proxy elements" for each cluster, with each proxy element being close/closest to the centroid of its cluster. For a particular network element type, separate clustering may be performed for each performance metric that applies to that network element type, so that different clusters may be defined for the same network elements based on the different performance metrics, and so that different proxy elements are selected based on the different performance metrics and respective clusters. If utilization (a first performance metric) and errors (a second performance metric) are performance metrics that are monitored for network interfaces, for example, the same network interfaces may be clustered one way based on utilization (the first performance metric) and another way based on errors (the second performance metric), and proxy elements for utilization clusters may be different than proxy elements for error clusters. Stated in other words, clustering may be performed for all network elements of a same type for a same performance metric. Once a proxy element is defined for a cluster (including network elements of a same type for a same performance metric), a full baseline of the performance metric, referred to as the proxy baseline, will only be calculated for the proxy element, and the proxy baseline will be used to monitor the performance metric for the non-proxy elements of the cluster. Accordingly, baseline calculations may be performed for a relatively small number of proxy elements without performing baseline calculations for every network element of every cluster. As a result, baseline calculations may only need to be performed for a relatively small number of managed elements.

According to some embodiments for a particular network element type, clustering may be performed based on a group of performance metrics simultaneously (as opposed to a single performance metric), and different groups of performance metrics may be used to cluster the same network elements differently so that the same network elements are clustered into first clusters for a first group of performance metrics and into second clusters for a second group of performance metrics. As discussed herein, defining clusters of network elements for a performance metric may thus include defining clusters of the network elements for a group of performance metrics.

Clusters may thus be defined by considering more than just a single performance metric (e.g., by considering a combination of multiple interface performance metrics). A decision to use multiple performance metrics for cluster formation may be driven by a "performance metric family" (i.e., a logical grouping of performance metrics) and/or scalability concerns. Generally, it may be faster to define one set of clusters of network elements that considers multiple metrics instead of defining a separate set of clusters each individual performance metric. The clusters would thus be defined based on the combination of performance metrics instead of a single performance metric, so that there may be some data accuracy degradation with respect to using the proxy baselines for a given performance metric. Stated in other words, for example, better baseline accuracy may be provided for interface utilization using clusters defined solely using interface utilization values. If clusters are defined based on 10 interface performance metrics, for example, some level of accuracy degradation to calculate the clusters once using a function that considers all 10 metrics (or some proper subset of) simultaneously to identify centroids may be acceptable. Ten proxy baselines could then be calculated for each cluster per centroid (proxy network element) only, and the resulting proxy baselines may be used for all other members of the cluster. Stated in other words, clusters may be defined once for a plurality of network elements as a function of a plurality of performance metrics, and a proxy network element may be defined/selected for each cluster. For each proxy network element, a proxy baseline may be calculated for each of the plurality of performance metrics, and each of the performance metrics may be monitored for each of network elements of each cluster using the respective proxy baselines for the respective clusters.

By defining clusters of network elements using k-means clustering based on performance metric data received from the network elements, the network elements may be divided into groups (clusters) that exhibit similar normal behaviors with respect to the performance metric. Moreover, by selecting one of the network elements of the cluster based on the centroid of the cluster (determined by k-means clustering) as the proxy element, the proxy element may be representative of the other network elements of the cluster with respect to the performance metric used to determine the cluster and the centroid of that cluster. Accordingly, each of the non-proxy network elements of the cluster can use the proxy baseline as a reasonable approximation of baseline behavior so that the number of baseline calculations can be significantly reduced. According to some embodiments disclosed herein, proxy baseline values may be used for "deviation from normal" threshold evaluations and/or to provide reference values for dashboard views and/or reports used to monitor network performance.

A baseline may thus be used to represent "normal" operation for a performance metric for a monitored network element, and a proxy baseline may be used to represent "normal" operation for the performance metric for all network elements of a cluster. More particularly, a proxy baseline for a performance metric may be provided with respect to a particular type of network element in the context of a particular time period (e.g., day/hour combination). A baseline (and thus a proxy baseline) may thus be provided with respect to a particular performance metric for a particular element type over a particular time period (day/hour). For example, a baseline may represent an estimated "normal" utilization (e.g., 85%) of a network interface between the hours of 8:00 PM and 9:00 PM on Fridays.

In CAPM, for example, hourly and daily baselines may be calculated for a network element by averaging historical performance metric data collected over a period of time up to twelve weeks. Because monitored network elements include network devices and multiple physical/logical elements of the network devices, up to 4 million network elements may be defined for monitoring, and 10s of performance metrics may be monitored for each network element. Accordingly, calculation of individual baselines for each network element for each performance metric may be prohibitive. In a performance management system intended to scale to 10 million addressable network elements, for example, it may not be feasible to calculate baselines quickly and/or efficiently for all network elements.

Figure 3:
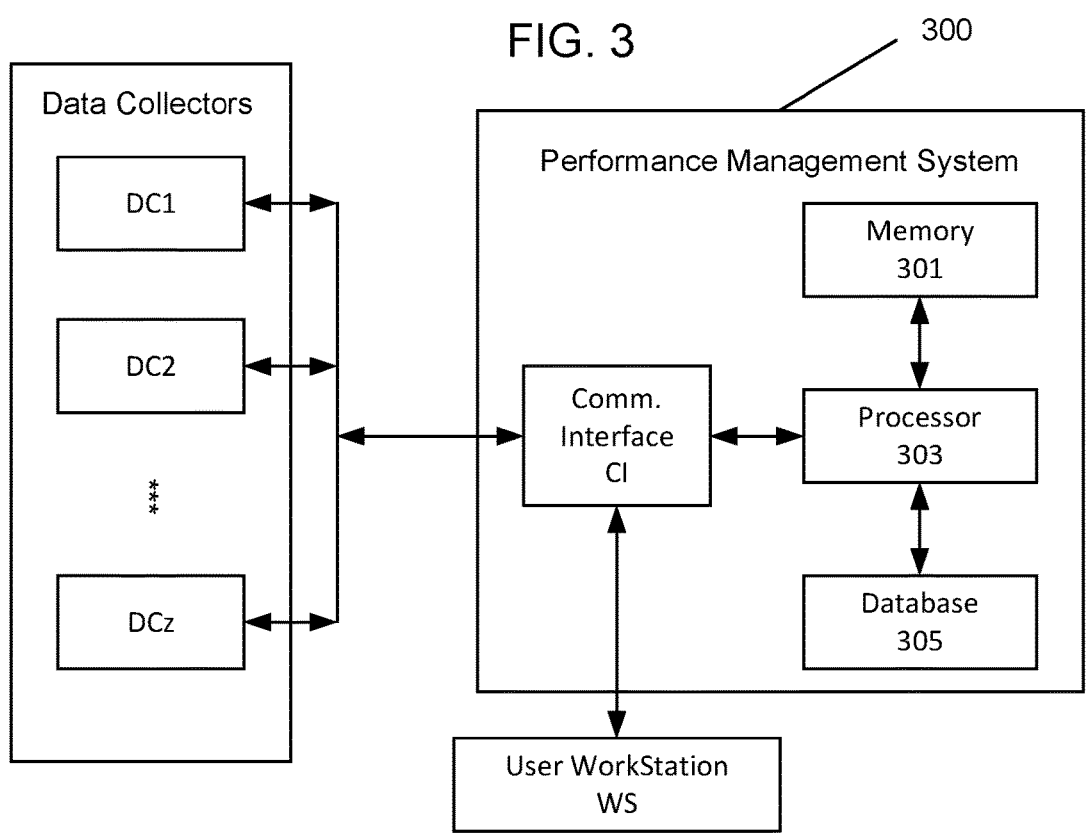
FIG. 3 is a block diagram illustrating a performance management system according to some embodiments of the present disclosure.

FIG. 3 is a block diagram illustrating a performance management system 300 according to some embodiments of the present disclosure. Performance management system 300 may include memory 301, processor 303, database 305, and communication interface CI. As shown, communication interface CI may provide communication between data collectors DC1 to DCz and processor 303, and between user workstation WS and processor 303. While a certain arrangement of elements is shown in FIG. 3 by way of example, it will be understood that elements/functions of FIG. 3 may be arranged differently according to embodiments disclosed herein. For example, database 305 may be provided separate/remote from performance management system 300, data collectors DC1 to DCz may be incorporated in performance management system 300, and/or user workstation WS may be incorporated in performance management system 300. Moreover, some operations discussed with respect to processor 303 may be performed at database 305, at user workstation WS, at data collectors DC1 to DCz, and/or at another system node.

According to some embodiments disclosed herein, performance management system 300 may provide performance management for a data communication network including a plurality of network devices/elements as discussed above with respect to FIGS. 1 and 2. Data collectors DC1 to DCz may collect performance metric data from network elements of FIGS. 1 and 2, and the performance metric data may be provided through communication interface CI to processor 303. Processor 303 may save this performance metric data in database 305, and this historical data may be used to perform clustering and/or to calculate proxy baselines as discussed in greater detail below.

Using the historical data from database 305, processor 303 may define a plurality of clusters of network elements for a performance metric. Each of the clusters may include multiple ones of the plurality of network elements, and the network elements of each cluster are mutually exclusive relative to the network elements of each of the other clusters. The clustering may be determined based on k-means clustering using historical performance metric data from a relative short time period (e.g., a day, an hour, etc.).

For each cluster, processor 303 may also define one of the network elements of the cluster as a respective proxy network element for the cluster. For example, the k-means clustering used to define the clusters may define a performance metric centroid, and the proxy network element for each cluster may be selected based on the calculated centroid for that cluster. For example, the network element from the cluster with performance metric data most closely matching that of the calculated centroid may be selected as the proxy network element for that cluster.

After selecting the proxy network elements for the respective clusters, processor 303 may calculate respective proxy baselines of the performance metric for each of the proxy network elements for each of the clusters based on performance metric data for the respective proxy network elements. By reducing the number of baselines that are calculated, efficiency of the performance management system may be improved. In particular, significant processing overhead may be reduced because each proxy baseline calculation may be performed using historical performance metric data taken over a relatively long period of time (e.g., up to 12 weeks).

Processor 303 may then monitor the performance metric for each of the network elements of the respective clusters of network elements using the respective proxy baselines of the performance metric for network elements of the respective clusters. Because each cluster is made up of network elements that have been grouped by similarities in performance metric behavior and because the proxy network element for each cluster has been selected as being representative of its cluster, use of a proxy baseline for a cluster (instead of using individual baselines for each network element) should not significantly impact operation and/or effectiveness of the performance management system.

As discussed below, k-means clustering may be used to define the clusters of network elements and to calculate the cluster centroids that are used to select the respective proxy network elements. To perform k-means clustering, a number of clusters k to be generated is defined, and performance metric data for each network element over the relevant time period is retrieved. To monitor utilization for network interfaces for a particular hour of the day, for example, processor 303 may collect performance metric data (from database 305) for utilization for each network interface for that hour of the most recent day, and processor 303 may use this performance metric data to perform k-means clustering to define clusters and proxy network elements.

Based on the performance metric data (e.g., utilization) for the network elements (e.g., network interfaces), processor 303 may select k network elements having averages of the collected performance metric data that are "farthest apart" to bootstrap k initial centroids for iterative k-means clustering. By way of example, the network elements with the highest and lowest performance metric averages will be selected as two of the initial centroids, and the remaining k−2 centroids may be selected to provide a greatest distance between each of the centroids. If k=3, for example, a network element with a performance metric average that is closest to the mean of the highest and lowest performance metric averages may be selected as the third of the initial centroids.

Once the initial centroids have been selected, performance metric averages for each of the remaining network elements is compared with the performance metric averages for each of the initial centroids. Based on these comparisons, each network element is assigned to a cluster corresponding to the initial centroid having the most similar performance metric average. For K=3, for example, the initial clusters of network elements will be defined based on the three initial centroids.

For each initial cluster, a performance metric average is calculated for the cluster based on the performance metric averages of all of the network elements in the cluster. The performance metric average for each cluster is then used as a new centroid for the cluster. Network elements are then assigned/reassigned to clusters using these new centroids. During the assignment/reassignment, performance metric averages for each of the network elements is compared with the new centroids. Based on these comparisons, each network element is assigned to a cluster corresponding to the new centroid having the most similar performance metric average.

Operations of calculating new centroids based on performance metric averages of the network elements in each cluster and assigning/reassigning network elements to clusters may be repeated until cluster membership settles (i.e., the network elements assigned to each cluster does not change). Once the cluster membership settles, the performance metric averages for each cluster may be used to define respective final centroids for the clusters, and proxy network elements for the respective clusters may be defined based on the final centroids. By way of example, a proxy network element may be selected for a cluster by selecting the network element of the cluster having a performance metric average closest to the final centroid of the cluster.

Determination of clusters using k-means averaging may thus be performed relatively efficiently using performance metric data from all of the network elements from a relatively short period of time, e.g., an hour or a day.

Once the proxy network elements are defined for the respective final clusters, processor 303 may calculate the proxy baselines using performance metric data from the proxy network elements. When calculating the proxy baselines, processor 303 may use performance metric data from database 305 for the proxy network elements over a relatively long period of time (e.g., 12 weeks). Calculation of the proxy baselines may thus be relatively efficient (even though performance metric data is considered over a relatively long period of time) because proxy baselines are calculated for a relatively small number of proxy network elements and not all network elements. Once the proxy baseline is calculated for a cluster, performance metric data for all network elements of the cluster may be monitored based on the same proxy baseline.

An example of k-means clustering is discussed with respect to the example of FIGS. 4A, 4B, and 4C. In the example of FIGS. 4A-4C, utilization is monitored as a performance metric for 20 network interfaces (identified as network elements 1, 2, . . . 20) that are identified in the first column of each table. The performance data (column 2 in each table) in this example is an average utilization (as a percent) for the respective network interface over a monitoring period (e.g., over an hour of the preceding day). In this example, network interface 1 has a utilization of 53%, network interface 2 has a utilization of 12%, . . . and network element 20 has a utilization of 5%. While 20 network elements are discussed by way of example with respect to FIGS. 4A-4C, embodiments herein may be implemented using hundreds or even thousands of network elements.

With k=3, initial centroids of 89, 2, and 46 may be selected based on the utilizations of network elements 5 (assigned to cluster A), 16 (assigned to cluster B), and 19 (assigned to cluster C) as indicated by "*" in the first and last columns of the table of FIG. 4A. Using these initial centroids, a distance/difference of the utilization for each network element relative to each initial centroid is calculated as shown in columns 3, 4, and 5 of FIG. 4A, and the least distance/difference is used to assign each network interface to a respective one of the clusters as shown in column 6 of FIG. 4A. Based on these initial cluster assignments, initial cluster averages are shown at the bottom of FIG. 4A, and these cluster averages are used as new centroids for the next iteration of cluster assignments shown in FIG. 4B.

A second iteration of k-means clustering is shown in FIG. 4B, where the first and second columns are unchanged relative to FIG. 4A. Here, the centroids are based on the cluster averages taken from FIG. 4A, and distances/differences of columns 3, 4, and 5 are calculated based on these centroids (i.e., 83.9 for Cluster A, 10.3 for cluster B, and 48.3 for cluster C). The least distance/difference for each network interface is then used to assign that network interface to a respective one of the clusters as shown in the last column of FIG. 4B. Comparing the last columns of FIGS. 4A and 4B, it can be seen that there has been a change in both proxy elements (network interfaces 2, 6, and 19 are proxy network elements based on proximity to the centroids) and cluster assignments (with network interfaces 3 and 10 changing clusters). Because there have been changes, cluster assignments have not settled and a further iteration is needed. Accordingly, new cluster averages are calculated as shown at the bottom of FIG. 4B, and these new cluster averages are used for the $3^{rd}$ iteration of k-means clustering of FIG. 4C.

In the third iteration of k-means clustering of FIG. 4C, columns 1 and 2 remain unchanged relative to FIGS. 4A and 4B. Here, the centroids are based on the cluster averages taken from FIG. 4B, and distances/differences of columns 3, 4, and 5 are calculated based on these centroids (i.e., 82.5 for cluster A, 12.6 for cluster B, and 49.5 for cluster C). The least distance/difference for each network interface is then used to assign that network interface to a respective one of the clusters as shown in the last column of FIG. 4C. Comparing the last columns of FIGS. 4B and 4C, it can be seen that there has been no change in proxy elements or cluster assignments. Accordingly, the cluster assignments have settled and further iterations of k-means clustering are not needed. The cluster averages are then used to select proxy network elements (i.e., network interfaces 2, 6, and 19). In this example, network interfaces 2, 6, and 19 are selected as proxy network elements for clusters B, A, and C, respectively, because these network interfaces have performance metric data (12, 82, and 46) closest to the respective cluster averages (12.6, 82.5, and 49.5).

Proxy baselines are then calculated using performance metric data for network interfaces 2, 6, and 19, without calculating baselines for other network interfaces (e.g., network interfaces 1, 3-5, 7-18, and 20). While a single proxy network element is provided for each cluster in the example of FIGS. 4A-4C, multiple proxy network elements may be selected for each cluster, for example, in a large scale environment.

Operations of processor 303 of FIG. 3 to provide performance management for a data communication network including a plurality of network elements are discussed below with respect to the flow chart of FIG. 5. At block 501, processor 303 may define a plurality of clusters of the network elements for the performance metric. Each of the clusters may include multiple ones of the plurality of network elements, and the network elements of each cluster may be mutually exclusive relative to the network elements of each of the other clusters. Definition of clusters is discussed above, by way of example, with respect to FIGS. 4A-4C. Defining the plurality of clusters at block 501 may include defining the plurality of clusters using k-means clustering.

The performance metric may include at least one of network element utilization, numbers of network element errors, and/or numbers of network element discarded messages. According to some embodiments, each of the plurality of network elements may include a network device, such as a server and/or a router. According to some other embodiments, each of the plurality of network elements may include an element of a network device, such as a memory slot of a network device, a network interface of a network device, a central processing unit core of a network device, a logical element of a network device, and/or a virtual process (e.g., a virtual firewall, a virtual router, etc.) of a network device.

At block 503, processor 303 may define for each of the plurality of clusters of network elements one of the network elements as a respective proxy network element for the cluster. If k-means clustering is used to define the clusters, defining for each of the plurality of clusters one of the network elements as a respective proxy network element may include using respective centroids of the k-means clustering for each cluster to select the respective proxy network elements for each of the clusters.

At block 505, processor 303 may calculate respective proxy baselines of the performance metric for each of the proxy network elements for each of the clusters based on performance metric data for the respective proxy network elements.

For example, defining the plurality of clusters and/or defining the proxy network elements at blocks 501 and/or 503 may include defining the plurality of clusters and/or proxy network elements using k-means clustering based on data of the performance metric collected from the plurality of network elements over a first period of time using data collectors DC1-DCz, with the data on the performance metric being received at processor 303 from data collectors DC1-DCz through communication interface CI. In contrast, calculating the respective proxy baselines at block 505 may include calculating the respective proxy baselines based on data of the performance metric collected from the proxy network elements over a second period of time using data collectors DC1-DCz, with the data of the performance metric being received at processor 303 from data collectors DC1-DCz through communication interface CI. Moreover, the second period of time may be at least two times longer than the first period of time, or even at least ten times longer than the first period of time. Because the performance data that is used to define the clusters and/or proxy network elements is collected over a relatively short period of time, definition of the clusters and/or proxy network elements may be relatively efficient even though data from the plurality of network elements is used. Where proxy baselines are calculated based on data of the performance metric collected over a longer period of time, processing overhead may be significantly reduced by not calculating baselines for each network element.

At block 507, processor 303 may monitor the performance metric for each of the network elements of the respective clusters of network elements using the respective proxy baselines of the performance metric for network elements of the respective clusters. For example, calculating the proxy baseline for a cluster may include processor 303 calculating the proxy baseline for the cluster based on data of the performance metric for the proxy network element without using data of the performance metric for at least one other network element of the cluster. Accordingly, monitoring the performance metric may include processor 303 monitoring the performance metric for the at least one other network element of the cluster using the proxy baseline of the performance metric.

Monitoring the performance metric at block 507 may include defining a proxy baseline range based on the proxy baseline. For example, data of the performance metric for a proxy network element may be processed to determine a mean and a standard deviation, and the proxy baseline may be defined as the mean. The proxy baseline range may be defined by an upper limit (e.g., the mean plus a multiple of the standard deviation) and a lower limit (e.g., the mean minus the multiple of the standard deviation). Processor 303 may thus monitor the performance metric for a particular network element by comparing real-time data of the performance metric with the lower and upper limits to determine if the network element is operating "normally." Monitoring, for example, may include processor 303 initiating at least one of a notification and an alarm responsive to the performance metric for one of the network elements of the cluster other than the proxy network element falling outside the proxy baseline range. In addition or in an alternative, monitoring may include processor 303 providing output for graphic display at user workstation WS, with the graphic display including a graphic representation of the proxy baseline range (e.g., including lower and upper limits) and data of the performance metric for at least one element of the cluster relative to the proxy baseline range. Data for the performance metric for a network element may thus be graphically presented relative to the proxy baseline range.

As discussed above, operations of FIG. 5 may be performed to monitor a performance metric (e.g., network element utilization, numbers of network element errors, and/or numbers of network element discarded messages) with respect to a type of network elements such as network devices (e.g., servers or routers) or elements of network devices (e.g., memory slots of a network devices, network interfaces of network devices, central processing unit cores of network devices, logical elements of network devices, and/or virtual processes of network devices).

Figure 5:
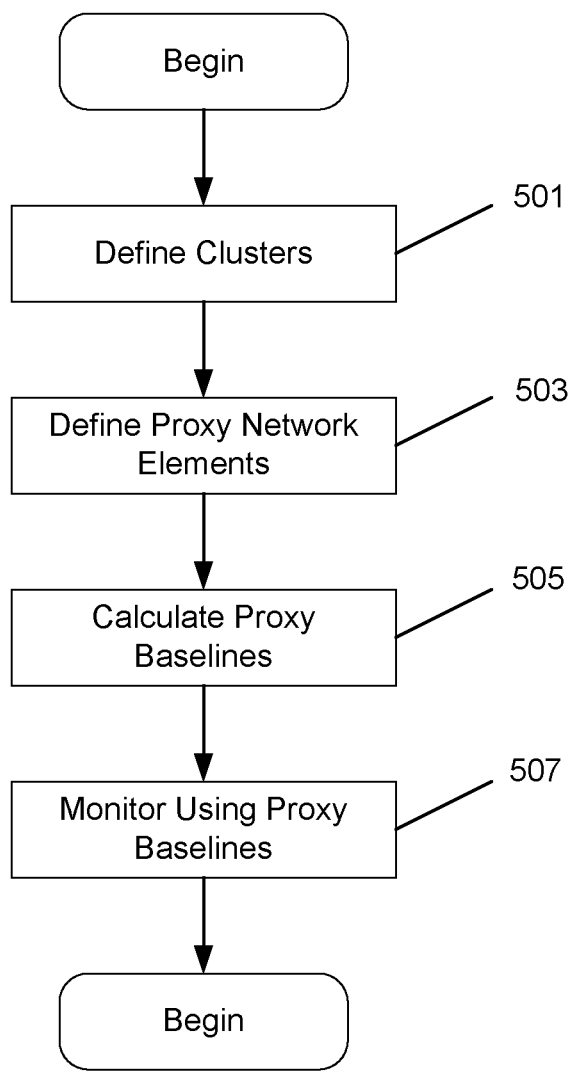
FIG. 5 is a flow chart illustrating operations of the performance management system of FIG. 3 according to some embodiments of the present disclosure.

According to some embodiments, operations of FIG. 5 may be performed as discussed above for the plurality of network elements with respect to a first performance metric so that a plurality of first clusters is defined for the plurality of network elements, so that respective first proxy network elements are defined for each of the first clusters, and so that respective first proxy baselines are calculated for each of the first clusters. In addition, the same operations of FIG. 5 may be performed for the same plurality of network elements with respect to a second performance metric (different than the first performance metric) so that a plurality of second clusters are defined for the same plurality of network elements, so that respective second proxy network elements are defined for each of the second clusters, and so that respective second proxy baselines are calculated for each of the second clusters. Stated in other words, operations of FIG. 5 may be performed in parallel for different performance metrics for the same plurality of network elements.

By way of example with respect to a second performance metric, processor 303 may define a plurality of second clusters of the network elements for a second performance metric at block 501. Each of the second clusters may include multiple ones of the plurality of the network elements, and the network elements of each second cluster may be mutually exclusive relative to the network elements of each of the other second clusters, and the plurality of first clusters and the plurality of second clusters may be defined differently. At block 503, for each of the second clusters of network elements, processor 303 may define one of the network elements as a respective second proxy network element for the respective second cluster. At block 505, processor 303 may calculate respective second proxy baselines of the second performance metric for the respective second proxy network elements for each of the second clusters based on second performance metric data for the respective second proxy network elements. At block 507, processor 303 monitor the second performance metric for each of the network elements of the respective second clusters of network elements using the respective proxy baselines of the second performance metric for network elements of the respective second clusters.

In the above-description of various embodiments of the present disclosure, aspects of the present disclosure may be illustrated and described herein in any of a number of patentable classes or contexts including any new and useful process, machine, manufacture, or composition of matter, or any new and useful improvement thereof. Accordingly, aspects of the present disclosure may be implemented in entirely hardware, entirely software (including firmware, resident software, micro-code, etc.) or combining software and hardware implementation that may all generally be referred to herein as a "circuit," "module," "component," or "system." Furthermore, aspects of the present disclosure may take the form of a computer program product comprising one or more computer readable media having computer readable program code embodied thereon.

Any combination of one or more computer readable media may be used. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

It is to be understood that the terminology used herein is for the purpose of describing particular embodiments only and is not intended to be limiting of inventive concepts. Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of this specification and the relevant art and will not be interpreted in an idealized or overly formal sense unless expressly so defined herein.

The flowchart and block diagrams in the figures illustrate the architecture, functionality, and operation of possible implementations of systems, methods, and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" (and the abbreviation "/") includes any and all combinations of one or more of the associated listed items Like reference numbers signify like elements throughout the description of the figures.

It will be understood that, although the terms first, second, etc. may be used herein to describe various messages, operations, and/or components, these messages, operations, and/or components should not be limited by these terms. These terms are only used to distinguish one message, operation, and/or component from another message, operation, and/or component. Thus, a first message, operation, and/or component discussed herein could be termed a second message, operation, and/or component without departing from the teachings of the present disclosure.

The corresponding structures, materials, acts, and equivalents of any means or step plus function elements in the claims below are intended to include any disclosed structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

The invention claimed is:

1. A method providing performance management for a data communication network including a plurality of network elements, the method comprising:
defining a cluster of the network elements for a performance metric;
defining one of the network elements of the cluster as a proxy network element for the cluster;
calculating a proxy baseline of the performance metric for the cluster based on performance metric data for the proxy network element; and
monitoring the performance metric for each of the network elements of the cluster using the proxy baseline of the performance metric.

2. The method of claim 1:
wherein defining a cluster comprises defining a plurality of clusters of the network elements for the performance metric, wherein each of the clusters includes multiple ones of the plurality of network elements, and wherein the network elements of each cluster are mutually exclusive relative to the network elements of each of the other clusters;
wherein defining one of the network elements of the cluster as a proxy network element comprises defining for each of the plurality of clusters of network elements one of the network elements as a respective proxy network element for the cluster;
wherein calculating the proxy baseline comprises calculating respective proxy baselines of the performance metric for each of the proxy network elements for each of the clusters based on performance metric data for the respective proxy network elements; and
wherein monitoring the performance metric comprises monitoring the performance metric for each of the network elements of the respective clusters of network elements using the respective proxy baselines of the performance metric for network elements of the respective clusters.

3. The method of claim 2, wherein the performance metric is a first performance metric, wherein the plurality of clusters is a plurality of first clusters, wherein the proxy network elements are first proxy network elements, and wherein the proxy baselines are first proxy baselines, the method further comprising:
defining a plurality of second clusters of the network elements for a second performance metric, wherein each of the second clusters includes multiple ones of the plurality of the network elements, and wherein the network elements of each second cluster are mutually exclusive relative to the network elements of each of the other second clusters and wherein the plurality of first clusters and the plurality of second clusters are defined differently;
defining for each of the second clusters of network elements one of the network elements as a respective second proxy network element for the respective second cluster;

calculating respective second proxy baselines of the second performance metric for the respective second proxy network elements for each of the second clusters based on second performance metric data for the respective second proxy network elements; and monitoring the second performance metric for each of the network elements of the respective second clusters of network elements using the respective proxy baselines of the second performance metric for network elements of the respective second clusters.

4. The method of claim 2 wherein defining the plurality of clusters comprises defining the plurality of clusters using k-means clustering, and wherein defining for each of the plurality of clusters one of the network elements as a respective proxy network element comprises using respective centroids of the k-means clustering for each cluster to select the respective proxy network elements for each of the clusters.

5. The method of claim 4 wherein defining the plurality of clusters comprises defining the plurality of clusters using k-means clustering based on data of the performance metric collected from the plurality of network elements over a first period of time, wherein calculating the respective proxy baselines comprises calculating the respective proxy baselines based on data of the performance metric collected from the proxy network elements over a second period of time, and wherein the second period of time is at least two times longer than the first period of time.

6. The method of claim 5 wherein the second period of time is at least ten times longer than the first period of time.

7. The method of claim 2, wherein defining the plurality of clusters of the network elements for the performance metric comprises defining the plurality of clusters of network elements for the performance metric based on a group of performance metrics including the performance metric.

8. The method of claim 7, wherein the performance metric is a first performance metric of the group of performance metrics, wherein the group of performance metrics includes a second performance metric, wherein calculating the proxy baselines comprises calculating respective first proxy baselines of the first performance metric for each of the proxy network elements based on performance metric data of the first performance metric for the respective proxy network elements, wherein calculating the proxy baselines comprises calculating respective second proxy baselines of the second performance metric for each of the proxy network elements based on performance metric data of the second performance metric for the respective proxy network elements, and wherein monitoring comprises monitoring the first and second performance metrics for each of the network elements of the respective clusters of network elements using the respective first and second proxy baselines of the first and second performance metrics for network elements of the respective clusters.

9. The method of claim 1 wherein calculating the proxy baseline comprises calculating the proxy baseline based on data of the performance metric for the proxy network element without using data of the performance metric for at least one other network element of the cluster, wherein monitoring the performance metric comprises monitoring the performance metric for the at least one other network element of the cluster using the proxy baseline of the performance metric.

10. The method of claim 1 wherein monitoring the performance metric comprises defining a proxy baseline range based on the proxy baseline.

11. The method of claim 10 wherein monitoring comprises initiating at least one of a notification and an alarm responsive to the performance metric for one of the network elements of the cluster other than the proxy network element falling outside the proxy baseline range.

12. The method of claim 10 wherein monitoring comprises providing output for graphic display at a user workstation, wherein the graphic display includes graphic representation of the proxy baseline range and data of the performance metric for at least one element of the cluster relative to the proxy baseline range.

13. The method of claim 1 wherein the performance metric comprises at least one of network element utilization, numbers of network element errors, and/or numbers of network element discarded messages.

14. The method of claim 1 wherein each of the plurality of network elements comprises a network device.

15. The method of claim 14 wherein each of the plurality of network elements comprises at least one of a server and a router.

16. The method of claim 1 wherein each of the plurality of network elements comprises an element of a network device.

17. The method of claim 16 wherein each of the network elements comprises at least one of a memory slot of a network device, a network interface of a network device, a central processing unit core of a network device, a logical element of a network device, and/or a virtual process of a network device.

18. A performance management system comprising:
a processor; and
a memory coupled to the processor and comprising computer readable program code that when executed by the processor causes the processor to perform operations comprising,
defining a cluster of the network elements for a performance metric;
defining one of the network elements of the cluster as a proxy network element for the cluster;
calculating a proxy baseline of the performance metric for the cluster based on performance metric data for the proxy network element; and
monitoring the performance metric for each of the network elements of the cluster using the proxy baseline of the performance metric.

19. The performance management system of claim 18:
wherein defining a cluster comprises defining a plurality of clusters of the network elements for the performance metric, wherein each of the clusters includes multiple ones of the plurality of network elements, and wherein the network elements of each cluster are mutually exclusive relative to the network elements of each of the other clusters;
wherein defining one of the network elements of the cluster as a proxy network element comprises defining for each of the plurality of clusters of network elements one of the network elements as a respective proxy network element for the cluster;
wherein calculating the proxy baseline comprises calculating respective proxy baselines of the performance metric for each of the proxy network elements for each of the clusters based on performance metric data for the respective proxy network elements; and
wherein monitoring the performance metric comprises monitoring the performance metric for each of the network elements of the respective clusters of network elements using the respective proxy baselines of the performance metric for network elements of the respective clusters.

20. A computer program product, comprising:

a non-transitory computer readable storage medium storing computer readable program code which when executed by a processor of an electronic device causes the processor to perform operations comprising:

defining a cluster of the network elements for a performance metric, defining one of the network elements of the cluster as a proxy network element for the cluster, calculating a proxy baseline of the performance metric for the cluster based on performance metric data for the proxy network element, and monitoring the performance metric for each of the network elements of the cluster using the proxy baseline of the performance metric.

\* \* \* \* \*